United States Patent [19]

Ouchi et al.

[11] Patent Number: 4,973,830
[45] Date of Patent: Nov. 27, 1990

[54] CODE READER

[75] Inventors: Junichi Ouchi; Koji Nakase; Hiroaki Sasaki, all of Furukawa, Japan

[73] Assignee: Alps Electric Co., Ltd., Tokyo, Japan

[21] Appl. No.: 315,975

[22] Filed: Feb. 27, 1989

[30] Foreign Application Priority Data

May 18, 1988 [JP] Japan .................. 63-119344

[51] Int. Cl.[5] ................................ G06K 7/10
[52] U.S. Cl. .................... 235/463; 235/437; 235/466
[58] Field of Search ............ 235/436, 437, 463, 466, 235/474, 462; 382/50, 53

[56] References Cited

U.S. PATENT DOCUMENTS

| | | | |
|---|---|---|---|
| 3,906,203 | 9/1975 | Butulis | 235/437 |
| 4,095,096 | 6/1978 | Harada et al. | 235/463 |
| 4,125,765 | 11/1978 | Cowardin et al. | 235/463 |
| 4,147,295 | 4/1979 | Nojiri et al. | 235/463 |
| 4,224,508 | 9/1980 | Kao | 235/462 X |
| 4,567,361 | 1/1986 | Rosenthal | 235/462 |
| 4,687,912 | 8/1987 | Ohta | 235/463 |

Primary Examiner—Stuart S. Levy
Assistant Examiner—Steven M. duBois
Attorney, Agent, or Firm—Guy W. Shoup

[57] ABSTRACT

A bit image converter for composing a decoder for converting the value of counting clocks loaded in response to the width of bars or spaces for composing a bar code into character information of a code reader is composed of a module number calculator for calculating the magnification of the basic module from the number of the modules for composing one code unit (one character), a module number total comparator for comparing the total sum of the number of the calculated modules with a specified number n of the modules, a module number corrector for correcting, if the number of the calculated modules is less than the specified number n (n-1), it to the specified number n, and a bit image output unit. Thus, the code reader is adapted for a multilevel bar code system so composed that a result becomes correct information by correcting, if the number of modules for composing one character is less than a specified number n, it.

1 Claim, 8 Drawing Sheets

CODE READER

BACKGROUND OF THE INVENTION

1. Field of the Invention

This invention relates to a code reader for reading a code, such as a bar code or the like displayed on a medium by scanning it by a photoelectric converter to decode information indicated by the code and to output it and, more particularly, to a code reader in which the reading rate of a multilevel bar code is improved.

2. Description of the Prior Art

There are as a bar code a binary level code in which "0" is indicated by a thin bar (narrow bar: Nb) or space (narrow space: Ns) and "1" is indicated by a thick bar (wide bar: Wb) or space (wide space: Ws), and a multilevel bar code in which "1" is indicated by a bar (B), "0" is indicated by a space (S), and and the same logic value is indicated by a bar or space having different width.

A bar code system is disclosed in "Method of forming bar code system" on pages 179-199 of Sensor Interfacing No. 4 of separate volume of Transistor Technology issued by CQ Publishing Co., Ltd. on July 1, 1984.

FIG. 6 is a pattern view showing an example of "JAN code" as a multilevel bar code. In FIG. 6, guard bars G1, G2 and G3 are disposed at both ends and the center of the code, and a plurality of bars or spaces, here a code of 6 characters (C1-C6, C7-C12) are displayed as a code composed of two pairs of bars or spaces between the guard bars of the ends and the central guard bar.

As described above, the multilevel bar code shown in FIG. 6 displays one code unit (one character) by two pairs of bars/spaces, and the amplitude (width) of each bar or space has an integer number times (n) as large as a basic unit (hereinafter referred to as "a basic module"). The width of the basic module (unit module) m is defined as the width of a guard bar G. In shown quaternary level code, information of a code is displayed by bars or spaces having widths of m, 2m, 3m and 4 m, and one character is composed of the width (7 m) of 7 basic modules (the module number n becomes n=7 when one character is composed of two pairs of bars or spaces).

FIG. 7 is an explanatory view of a calculation of decoding a multilevel bar code in FIG. 6. The magnitude of the basic module (m) is obtained by attaining the width of a guard bar G1 read at the initial of scanning by a photoelectric converter (hereinafter referred to as "a scanner") as the counted value of clocks, and dividing the width of the subsequent bar or space by this value to obtain the magnification of m for each. A character C in the example in FIG. 7 is displayed by "1110010" of 7 bits (n=7), since B1 is 3 m, S1 is 2 n, B2 is m, and S2 is m in width.

In the prior art described above, the level of the bar or space for composing a character is determined by dividing with integer number the number of counting clocks of the bar or space subsequently loaded as a dividend by the number of counting clocks of the basic module m initially loaded as a divisor.

Since the bar code of this type is displayed by using a printer on a medium, it might be oozed at the time of printing it. In case of reading it by a scanner, a gradation might occur in a scanner optical system or a scanning speed might not be constant. Thus, the number of counting the bar or space loaded is displaced from the value of the magnification of an integer number of basic module m with respect to the number of counting the m. Then, the number of the bar code divided by the basic module, for example, among two pairs of bars or spaces for composing a character becomes more or less than the specified number n, thereby causing an error in reading. In fact, in most cases, the dividing result becomes less rather than more than the specified number n, and it frequently becomes (n−1) 1 less than the specified number.

This means that, in the reading by the scanner, it is ordinarily impossible that the value of counting clocks of each bar or space exceeds one basic module, and if it might occur, its printer or scanner should have a problem.

The number of the basic modules for composing each bar or space is determined by the division of integer number, and the remainder generated in the calculation is discarded in each division. Accordingly, if (n−2) frequently occurs, its printer or scanner should have a trouble similarly to the above case, and it is rare that the module number becomes (n−2) or less. Such being the case, if a remedy for the case of (n−1) is provided, most errors can be obviated.

SUMMARY OF THE INVENTION

Accordingly, an object of this invention is to provide a code reader adapted for a multilevel bar code system so composed that a result becomes correct information by correcting, if the number of modules for composing one character is less than a specified number n, it.

In order to achieve the above and other objects according to this invention, a bit image converter for composing a decoder for converting the value of counting clocks loaded in response to the width of bars or spaces for composing a bar code into character information is composed of a module number calculator for calculating the magnification of the basic module from the number of the modules for composing one code unit (one character), a module number total comparator for comparing the total sum of the number of the calculated modules with a specified number n of the modules, a module number corrector for correcting, if the number of the calculated modules is less than the specified number n (n−1), it to the specified number n, and a bit image output unit.

The module number counter divides the number of counting clocks corresponding to the bars or spaces read by the value of counting the basic modules to determined the quotient and the remainder, and feeds them to the module number corrector. The module number corrector stores the quotient and the remainder for one character, adds "1" to the number of the modules of the bar or space having the largest remainder as the specified module number when a signal representing that the module number indicates one less than the specified number is inputted from the module number total comparator.

The module for one character thus corrected to the specified module number is outputted in the format to be stored in a bit image memory in the bit image output unit.

The module number total comparator outputs the module for one character stored in the module corrector from the bit image output unit as it is if the module number for one character from the module number corrector is equal to the specified number, and outputs a reset signal if it is larger than the specified number.

In this manner, the bar code read when the module for one character is equal to the specified number and when it is 1 less than the specified number, and resets the reader if it is less than that.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

An embodiment of the present invention will be described in detail with reference to the accompanying drawings.

Figure 8:
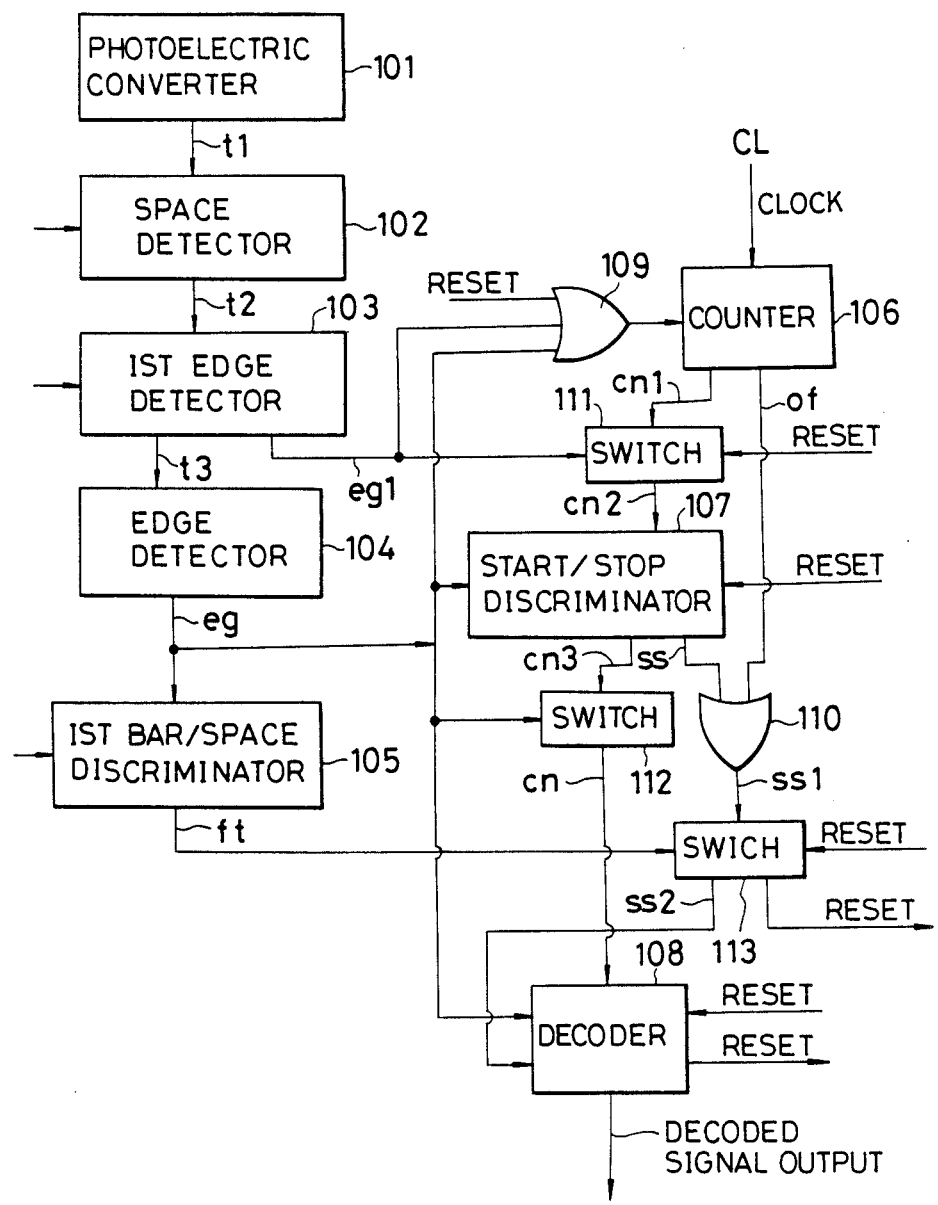
FIG. 8 is a view of an entire arrangement of an example of a code reader.
Figure 9:
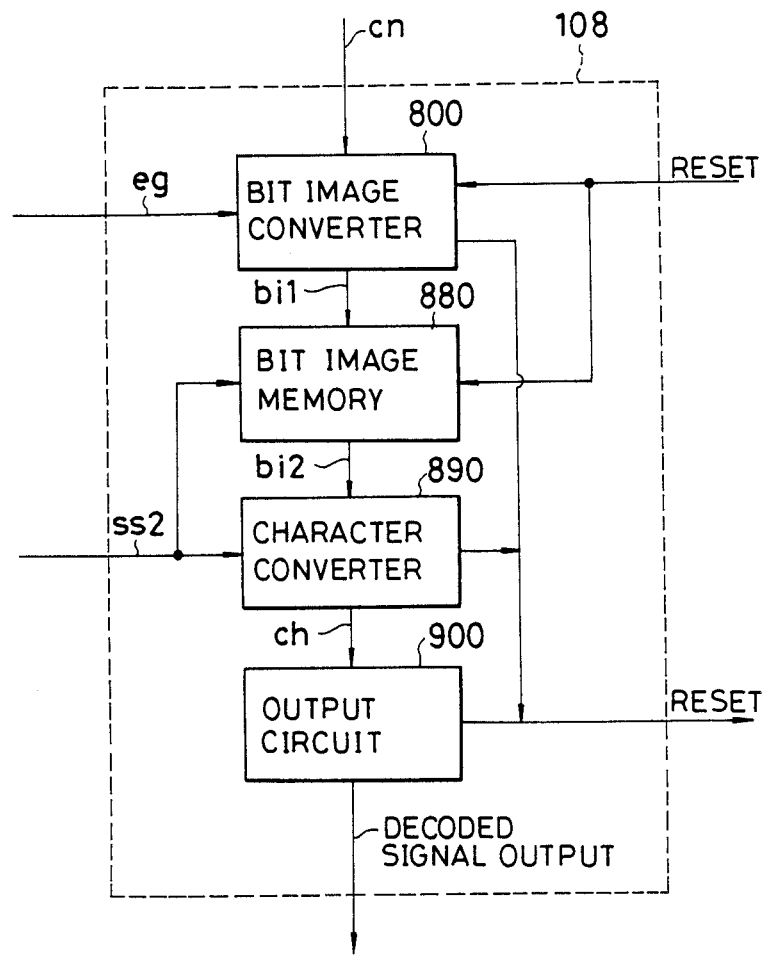
FIG. 9 is a block diagram for explaining the general arrangement of a decoder in FIG. 8.

Referring first to FIGS. 8 and 9, the general arrangement of a code reader to which the present invention is applied will be described.

FIG. 8 is a view of the entire arrangement of an example of a code reader. In FIG. 8, reference numeral 101 denotes a photoelectric converter (scanner); 102, a space detector; 103, a first edge detector; 104, an edge detector; 105, a first bar/space discriminator; 106, a counter; 107, a start/stop discriminator; 108, a translator (hereinafter referred to as "a decoder"); 109 and 110, OR gates; and 111, 112, 113, switching units.

In FIG. 8, the photoelectric converter 101 has a photoelectric converter element (sensor), such as a CCD, reads a bar code printed and displayed on a medium, and supplies a binary level signal t1 responsive to its pattern to the space detector 102. The space detector 102 detects the fact that the space (input unit space) before the bar code display unit starts scanning is larger than a predetermined width of the space for composing the pattern of the bar code, thereby detecting that it is the input unit space of the bar code, and outputs the detection output t2. The first edge detector 103 detects the initial edge of the bar code, i.e., the front edge of the initial bar of the bar code pattern to 0-clear the detection signal eg1 of the counter 106 through the OR gate 109 and to operate the switching unit 111 to input the count signal cn1 from the counter 106 as cn2 to the start/stop discriminator 107. The counter 106 outputs the width between the edges of the signal eg of the variation point (edge) of the bar/space of the bar code pattern as the counted value cn3 of clocks CL each time the first edge detector 103 and the edge detector 104 detect the variation edges of the bar/space of the bar code pattern. The first bar/space discriminator 105 detects the first bar or first space of the bar code pattern in accordance with the edge detection signal eg of the edge detector 104 to switch the detection signal ft by the switching unit 113 to the decoder 108, and supplies the counted value cn between the edges after the discrimination of the first bar/space of the first bar/space discriminator 105. The start/stop discriminator 107 discriminates the start and the end of the bar code pattern in accordance with the edge signal eg detected by the edge detector 104, and applies a signal ss1 for indicating the start and the end of the decoding operation of the decoder 108 as ss2 to the decoder 108.

The decoder 108 decodes it in accordance with the counted value cn of the clocks CL corresponding to the width of the bar or space for composing a bar code pattern to decode it to a binary signal to be read by a computer for the meaning of the bar code, and outputs it.

This invention relates to the decoder 108 in FIG. 8, and the general description of the arrangement of the decoder will be described.

FIG. 9 is a block diagram for explaining the general arrangement of the decoder. Reference numeral 800 denotes a bit image converter; 880, a bit image memory; 890, a character converter; and 900, an output circuit.

In FIG. 9, the bit image converter 800 operates by the edge detection signal eg of the edge detector, converts the counted value cn of the clocks CL into a bit image signal, and applies a conversion signal bi1 to the bit image memory 880. The character converter 890 starts operating by the decode start signal ss2, converts the bit image signal bi2 stored in the bit image memory 880 into a character signal, and outputs the converted character signal ch through an output circuit 900 as a decode signal.

A code reader according to the present invention has its features in its bit image converter 800 of the decoder, and the detail of the bit image converter 800 will be described with reference to the drawings.

Figure 1:
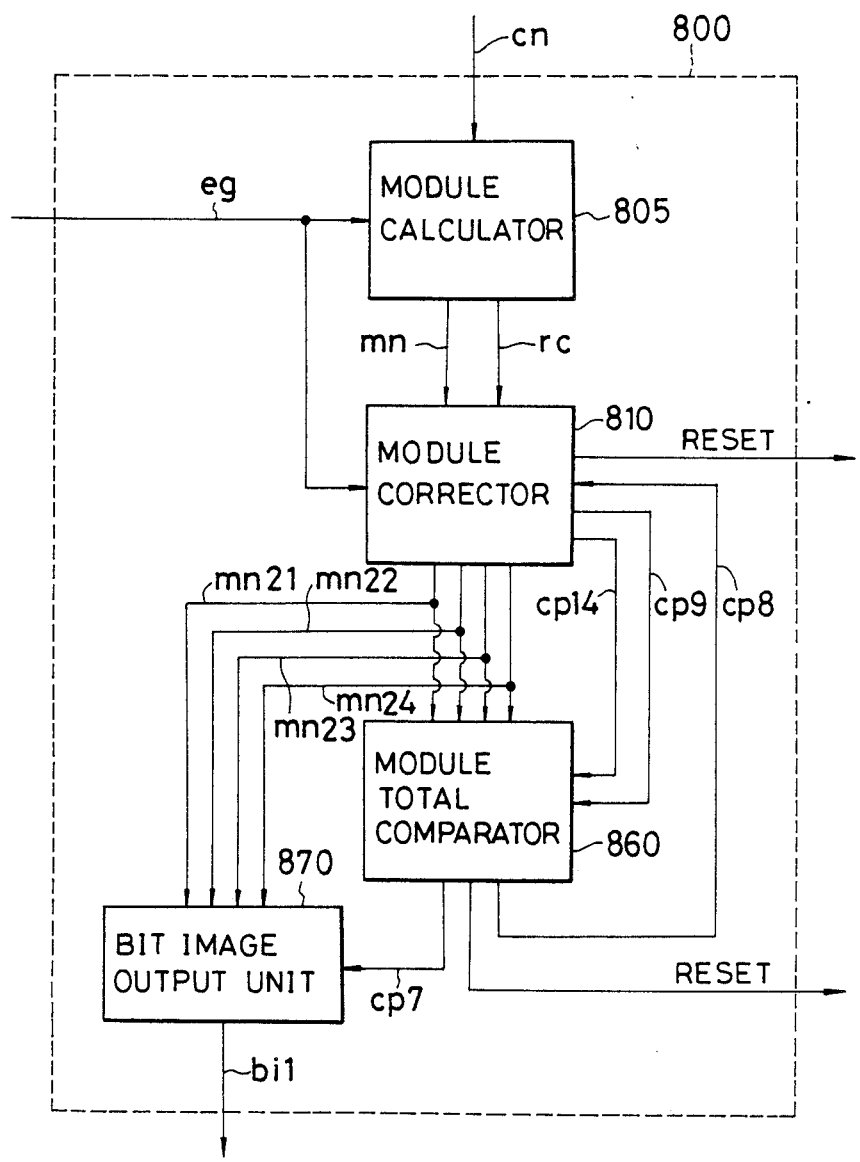
FIG. 1 is a block diagram for explaining an embodiment of a bit image converter according to the present invention.

FIG. 1 is a block diagram for explaining an embodiment of a bit image converter according to the present invention. In FIG. 1, reference numerals 805 denotes module number calculator; 810, module number corrector; 860, module number total comparator; and 870, a bit image output unit.

In FIG. 1, the module number calculator 805 fetches the counted value cn of clocks CL corresponding to the width of the bar or space counted by the counter 105 by the input of the edge detection signal eg from the edge detector 104 in FIG. 8, divides the counted value cn by the counted value m of the basic modules, and applies the quotient mn (the number of the basic modules) and the remainder rc (the number of the remaining clocks) to the module number corrector 810. The module number corrector 810 stores the quotient mn and the remainder 4c from the module number counter 805 for one character in accordance with the input of the edge detection signal eg, and applies the number of the basic modules per one module for composing one character as mn21, mn22, mn23, mn24 corresponding to the pattern of the bar code to the module number total comparator 860 and the bit image output unit 870.

The module number total comparator 860 is initially operated by the signal cp14 representing the initial from the module number corrector 810, and then operated by the signal cp9 representing that the module number corrector has corrected once the number of the modules.

When the cp14 is inputted, the module number total comparator 860 calculates the total sum of the inputted module numbers mn1, mn2, mn3, mn4, and applies a signal cp7 to the bit image output unit 870 when it is equal to "7". The bit image output unit 870 converts the module numbers of mn21 to mn24 to a format to be easily stored in the bit image memory 880, and outputs as a signal bi1 by the input of the cp7.

When the total sum of the number of the modules is larger than the specified value, it outputs a reset signal, while when it is smaller than the specified value, it first applies cp8 to the module number corrector 810, adds "1" to the number of the modules having the largest remainder at the time of dividing, the module number total comparator 860 again compares as mn21 to mn24 together with the cp9 with the specified number, outputs cp7 if it is equal to the specified number, and outputs a reset signal when it is still smaller than the specified number.

Figure 2:
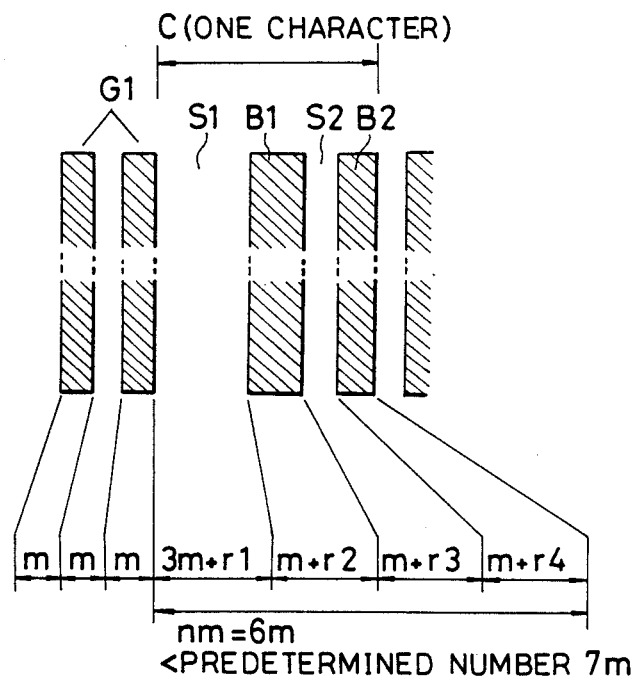
FIG. 2 is an explanatory view of a module number correcting operation in FIG. 1.
Figure 7:
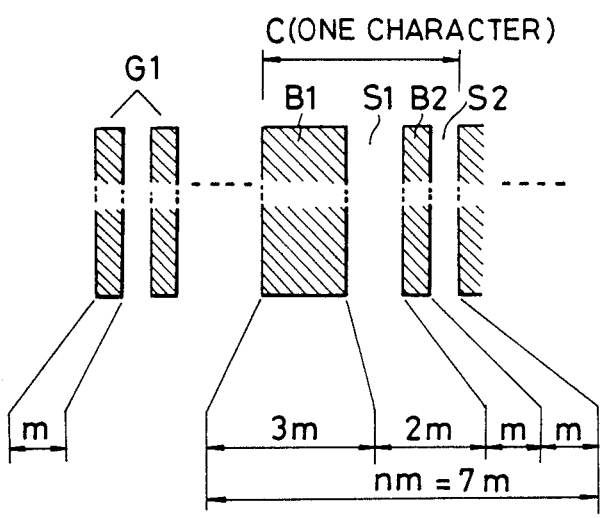
FIG. 7 is an explanatory view of a decoding operation of a multilevel bar code in FIG. 6.

FIG. 2 is an explanatory view of the module number correcting operation in FIG. 1. Similarly to FIG. 7, reference symbol G1 denotes a guard bar; and S1, B1, S2, B2, two pairs of bars/spaces for composing one character.

In FIG. 2, the guard bar G1 designates the magnitude of the basic module, and its width m is determined by the counted value of clocks CL when it is read. The S1 is the bar of the width having three times as large as the width of the basic module, i.e., the bar of 3 m, the B1 is 2×m, i.e., 2 m, and the S2, B2 are 1×m, i.e., the code having the width m.

The shown bar code is displayed as 7 m for one character, i.e., 7 basic modules for one character as an example of a multilevel bar code. When this bar code is read, there are theoretically obtained the counted value of the clocks CL corresponding to total 7 m of 3 m, 2 m, m, m of each bar/space. However, as described above, the width of the bar or space is actually varied due to the ooze at the time of printing the bar code or the gradation of the optical system of the photoelectric converter, and the value (quotient) obtained by dividing the counted value of the bar or space by the counted value of the basic modules does not become an integer number, but generates a remainder.

In FIG. 2, the counted values nm21, nm22, nm23, nm34 of the S1, B2, S2, B2 respectively become as shown 3m +r1, m+42,m+r3, m+r4 (3m, m are quotient, r1 0 r4 are remainders). In other words, the B1 should be twice as large as the basic module m, but actually becomes m+r2, this r2 becomes larger than the other remainders r1, r3, r4. Accordingly, in the module number comparator 860, the total sum of the number of the modules becomes one less than the specified number 7 (being 6 m). In this manner, when the total sum of the number of the modules becomes 6 m, in FIG. 1, the signal cp8 is applied to the module number corrector, the module number corrector 810 then compares the remainders r1, r2, r3, r4 of the modules stored, adds "1" to the number of the modules of the bar or space (here B1) having the largest remainder, and again outputs the result to the module number total comparator 860. The module number total comparator 860 compares the total sum of the numbers of the modules mn21 to mn24 thus inputted, confirms the quality to the specified number, applies the signal cp7 to the bit image output unit, and supplies the mn21 to mn24 to the bit image memory.

As described above, the module number total comparator 860 applies the cp 8 to the module number corrector 810 to correct the number of the modules when the total sum of the number of the modules received initially from the module number corrector 810 is less than the specified number n (n=7). However, if the total sum becomes, for example, 5, the number of the modules thus corrected is still less than 7. At this time, it outputs a reset signal by the signal cp9 representing that one correction has already been conducted.

Figure 3:
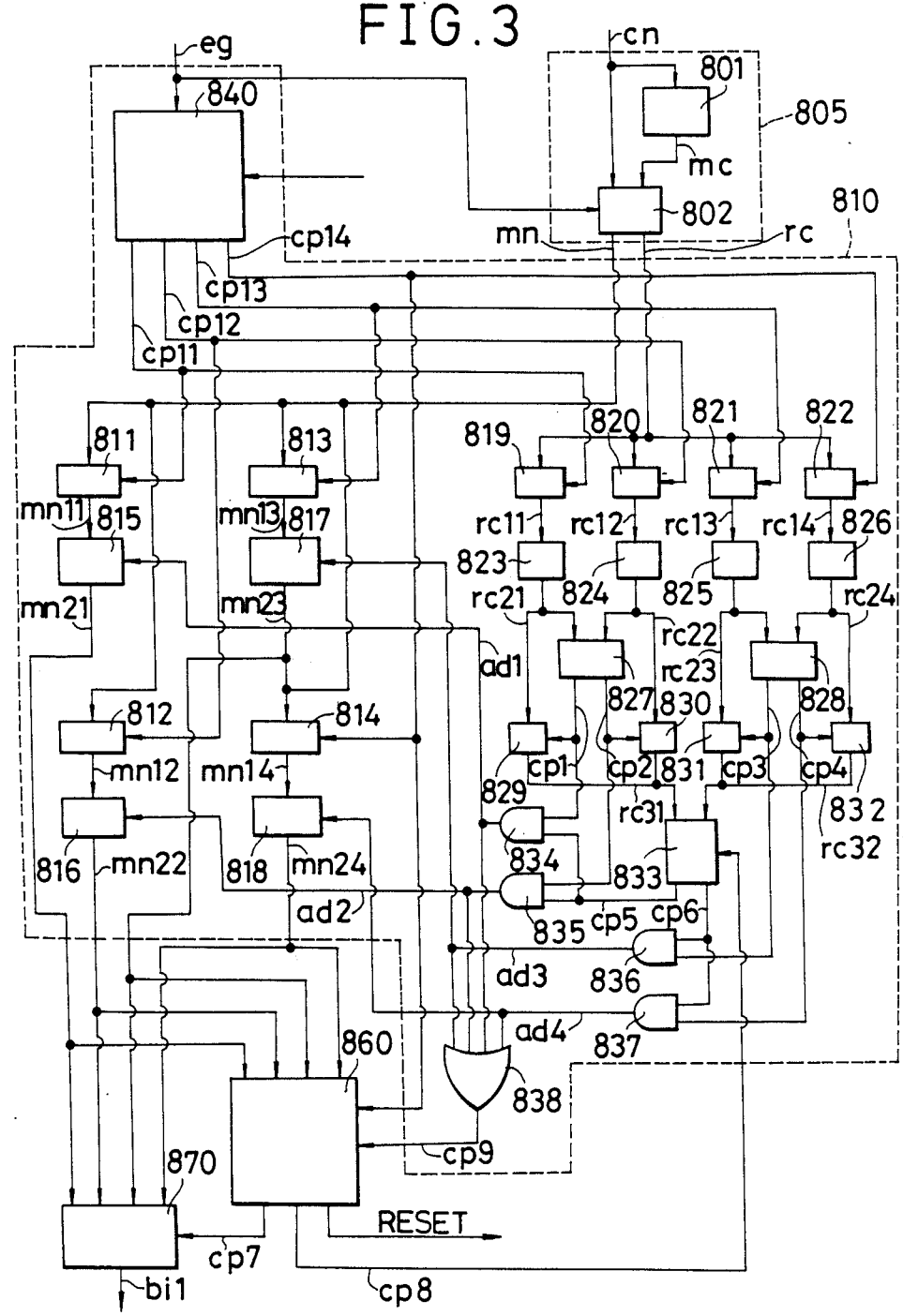
FIG. 3 is a view of a detailed arrangement of a bit image converter in FIG. 1.

FIG. 3 is a view of a detailed arrangement of the bit image converter shown in FIG. 1. A module number counter 805 has a module count decision unit 801 and a divider 802. The counted value cn is inputted to the module count decision unit 801 to decide the counted value per one module, which is applied as a signal mc to the divider 802, which is operated by the input of the edge signal eg to divide the counted value cn by the counted value mc per one module, and to output its quotient mn and its remainder rc.

The module number corrector 810 has a module switching signal generator 840, a first module counter 815, a second module counter 816, a third module counter 817, a fourth module counter 818, a first module remainder memory 823, second module remainder memory 824, a third module remainder memory 825, a fourth module remainder memory 826, comparators 827, 828, 829–832, and AND gates 834–837, OR gates 838. Whenever the module switching signal generator 840 counts the number of the edge detection signals eg, signals cp11, cp12, cp13, cp14 are applies to the switching units 811 and 819, 812 and 820, 813 and 821, and 814 and 822. The cp14 is given as a signal representing the initial comparing operation to the module number total comparator 860.

The switching units 811, 812, 813, 814 and the switching units 819, 820, 821, 822 operate to apply the quotient mn of the divider 802 to the first to the fourth module counters 815, 816, 817, 818 by the input of the signals cp11, cp12, cp13, cp14 from the module switching signal generator 840, and to store the remainders 4c in the first to the fourth module remainder memories 823 to 826.

The first to the fourth module counters 815 to 818 sets the values mn11 to mn14 of the quotient mn through the switching units 811 to 814, and any of them is counted up by 1 by any of the signals ad1 to ad4 from AND gates 834 to 837 to be described later.

The first module remainder memory 823 to 826 store the remainders 4c11 to rc14 of the respective modules of the remainders 4c of the divider 802, comparators 827, 828 compare the stored remainders rc11 to rc14 with the value rc21 of the first module remainder memory and the value rc22 of the second module remainder memory 824, the value rc24 of the third module remainder memory 825 and the rc24 of the fourth module remainder memory 826, and the comparison results are applied to the comparators 833 to be compared.

More specifically, the largest remainder of the remainders rc11 to rc14 of the respective modules is calculated. As a result, it is output from any gate of the AND gates 834 to 837, applied to any of the first to the fourth module counters 815 to 818, and so counted up as to add "1" to the counted value. In the example of FIG. 2, since the remainder of the second module, i.e., B1 is maximum, the second module counter 816 is counted up by "1" by the output ad2 of the AND gate 835.

In other words, the comparator 827 applies cp1 to the switching unit 829 and the AND gates 834, 835 in case of the rc21 equal to or larger than the rc22, cp2 similarly in case of the rc21 smaller than the rc22, and the comparator 828 outputs the cp3 in case of the rc23 equal to or smaller than the rc24 and cp4 in case of the rc23 smaller than the rc24. The comparator 833 is operated by the signal cp representing that the inputted module number is smaller than the specified module number in the module number total comparator 860 to output cp5 in case of the rc31 larger than the rc32, and cp6 in case of the rc31 smaller than the rc32. When the comparators 827, 828, 833 produce output signals cp1 to cp6, any of the outputs ad1 to ad4 is outputted to the AND gates 834 to 837.

The OR gates 833 generates the cp9 by any of the ad1 to ad4, and the cp9 notifies one correction of the module number to the module number total comparator 860.

Figure 4:
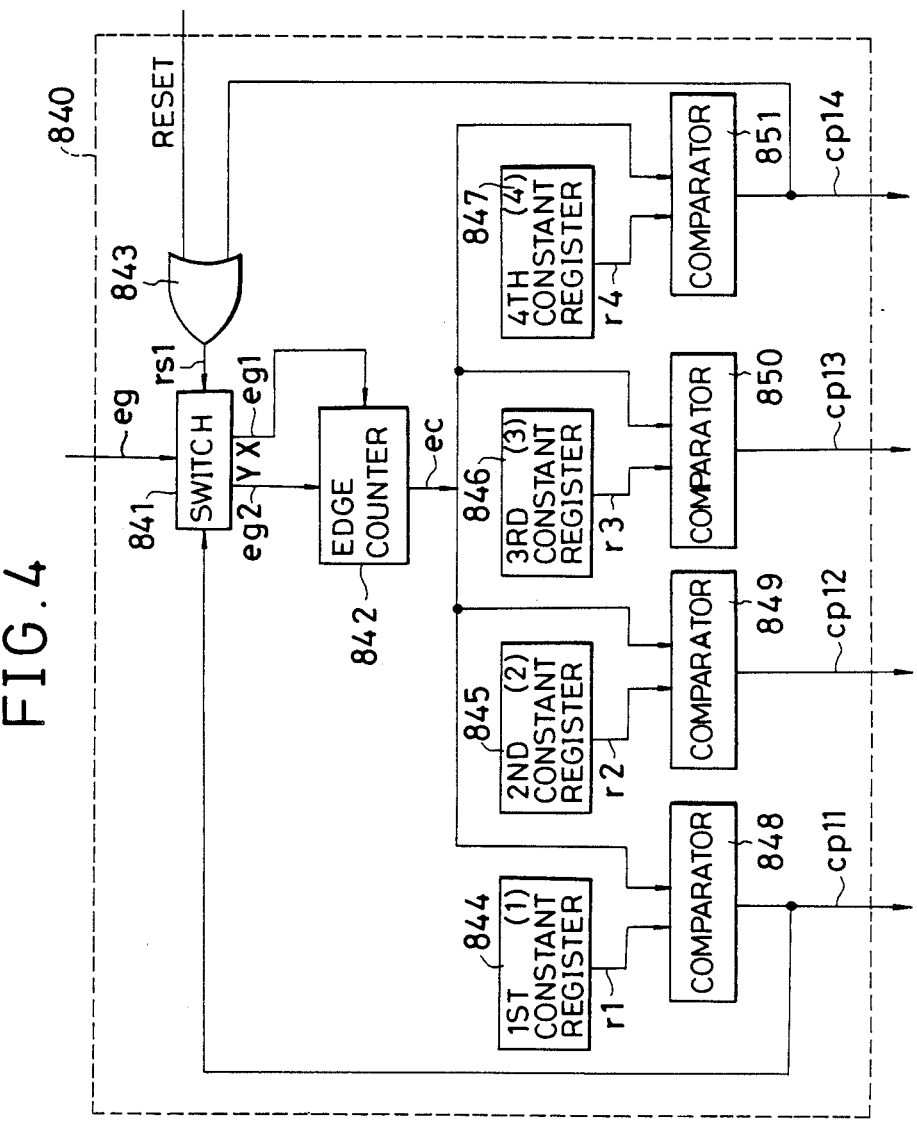
FIG. 4 is a view of a detailed arrangement of a module switching signal generator in FIG. 3.

FIG. 4 is a view of the detailed arrangement of the module switching signal generator in FIG. 3. The module switching signal generator has a switching unit 841, an edge counter 842, an OR gate 843, a first constant register 844, a second constant register 845, a third constant register 846, a fourth constant register 847, and comparators 848 to 851.

This module switching signal generator 840 receives an edge detection signal eg from the edge detector 104 in FIG. 8, and sequentially outputs edge switching signals cp11 to cp14. The switching unit 841 is switched to X side by a reset signal from the OR gate 843 or a signal rs1 due to the cp14, sets the edge counter 842 to "1" with the edge detection signal eg as the eg1, switched by the cp11 to Y side, and applies the eg as the eg2 to the edge counter 842. The edge counter 842 is set to "1" by the eg1, and is then counted up by the eg2, and applies its counted value ec to comparators 848 to 851. "1" is set in advance in the first constant register 844, and the comparator 848 outputs a coincidence signal cp11 when the set value 1 of the first constant register 844 and the counted output ec of the edge counter 842 are "1".

Similarly, "2" is set in advance in the second constant register 845, "3" is set in advance in the third constant register 846, and "4" is set in advance in the fourth constant register 847, and coincidence outputs cp12, cp13, cp14 are output from the comparators 849, 850, 851 whenever they coincide with the counted outputs ec of the edge counter 842.

More specifically, the module switching signal generator 840 outputs a signal representing the module switching point of the bar code pattern corresponding to the number of the modules of 1, 2, 3, 4 in response to the edge detections.

Figure 5:
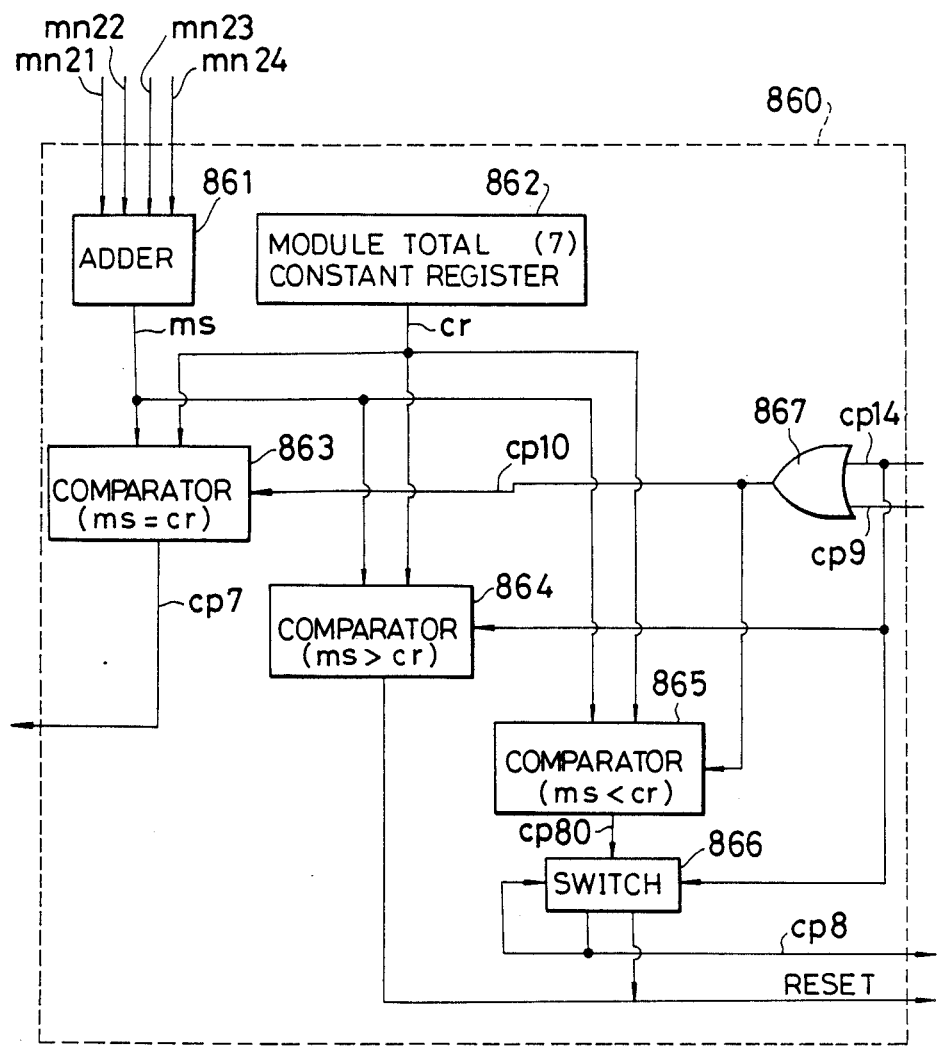
FIG. 5 is a view of a detailed arrangement of a module number total comparator in FIG. 1.
Figure 6:
FIG. 6 is a pattern diagram showing an example of JAN code of a multilevel bar code.

FIG. 5 is a view of a detailed arrangement of the module number total comparator in FIG. 1. The module number total comparator has an adder 861, a module number total constant register 862, comparators 863, 864, 865, a switching unit 866, and an OR gate 867.

In FIG. 5, the module number total comparator detects the coincidence of the total sum of the signals mn21 to mn24 representing the number of the basic modules of the respective modules (the number of the basic modules for composing a module) from the module number corrector 810 in FIG. 1 with the specified number of the modules (the number of the basic modules for composing one character), or the larger or smaller value. In this embodiment, since the specified module number is 7 modules of two pairs of the bars/spaces as shown in FIG. 2, 7 is set in the module number total constant register 826.

In FIG. 5, the adder 361 adds signals mn21, mn22, mn23, mn24 representing the number of the modules of the respective modules for composing one character, and applies the addition signal ms to the comparators 863, 864, 865. The comparator 863 operates by the co10, compares the signal ms with the cr, applies a coincidence signal cp7 to the bit image output unit 870 in FIG. 1 in case of ms=cr, i.e., ms being 7, and applies it as a read signal to the bit image memory without correction.

The comparator 864 is operated by the cp9, and outputs a rest signal in case of ms larger than cr, i.e., when the total sum of the number of the modules exceeds the specified number (larger than 7) to top the reading operation.

The comparator 865 is operated by the cp10, outputs the signal cp80 in case of ms smaller than cr, i.e., when the total sum of the modules is less than 7, and converts the cp80 to cp8 by the input of the cp14 to apply it to the module number corrector. Similarly, the switching unit 866 connects the cp80 to the reset line by the cp8.

The module number correcting operation by the output signal of the module number total comparator 860 is as described above, In the embodiment described above, the width of the bar or space for displaying the multilevel is represented by m as the width of the basic module as the examples of the multilevel bar code of the specified module number 7 by the two pairs of the bars/spaces at the four levels of m, 2 m, 3 m, 4 m. However, this invention is not limited to the particular embodiment. This invention may be applied to the reader of multilevel bar code of various types.

According to the present invention as described above, the defect of the number of the modules due to the remainder at the time of calculating the number of the modules when the multilevel bar code is read is corrected by statistical means to eliminate the reading error due to the loss of one module caused by the main cause of erroneous reading. Thus, the reading rate of the reader of this type can be remarkably improved.

What is claimed is:

1. A code reader for reading a multilevel bar code displayed by n pieces of bars or spaces of the magnification of integer number of the amplitude of a basic module in the magnitude of one code unit as a counted value of clock signals corresponding to the magnitude of the bars or the spaces comprising a module number calculator means for dividing the counted value of the clock signals corresponding to the modules of said bars or spaces by the counted value of the clock signals corresponding to said basic modules to form its quotient and its remainder as one code unit, a module number total comparator means for comparing the total sum of the one code units of said quotient with said n, a module number corrector means for adding "1" to the number of the modules of the bars or spaces corresponding to the maximum remainder of the remainders of said one code unit when the comparison result of said module number total comparator means is (n−1), and a bit image output means for outputting a decode signal when the total sum of the number of the modules of one code unit coincides with said n.

* * * * *